INVENTOR.
KENNETH N. OLSON
BY
OSTROLENK, FABER, GERB & SOFFEN
ATTORNEYS

United States Patent Office 3,453,466
Patented July 1, 1969

3,453,466
SYNCHRO GENERATOR HAVING TWO STATIONARY WINDINGS COUPLED BY SKEWED ROTOR
Kenneth N. Olson, Carle Place, N.Y., assignor to Kollsman Instrument Corporation, Syosset, N.Y., a corporation of New York
Filed Dec. 29, 1967, Ser. No. 694,633
Int. Cl. H02k 37/00
U.S. Cl. 310—49
8 Claims

ABSTRACT OF THE DISCLOSURE

A synchro transmitter composed of two axially spaced stationary windings and a rotatable skewed winding mounted concentric and external of one of the windings to control the magnetic coupling between the windings.

This invention is an improvement of the device shown in U.S. Patent No. 2,571,810 in the name of Andresen Jr., entitled "Rotary Electrical Transmitter."

This invention relates to synchro transmitters and more particularly relates to a synchro transmitter having a rotatable skewed winding which is concentric and external of one of a pair of spaced stationary windings to control the coupling therebetween.

Synchro transmitters having a single rotatable skewed winding are well known and are shown in the above-noted U.S. Patent No. 2,571,810. The rotation of the skewed winding affects the coupling between two spaced stationary windings, thereby generating an output voltage in one of the windings, induced from the other which is related to the angular position of the skewed rotatable winding.

The previous construction of these devices placed the skewed winding physically between the two stationary windings and on a central part of a magnetic shaft carrying both stationary windings. This, in turn, required that one of the stationary windings be formed in internal slots in iron laminations, thus requiring complicated winding techniques for this winding. The structure further required a complex and expensive pivotal mounting for the skewed windings.

A primary object of this invention is to simplify the manufacturing techniques required for forming a synchro transmitter having a single rotatable skewed winding.

Another object of this invention is to form a synchro transmitter having a single rotatable skewed winding which has stationary windings which can be made with automatic coil winding equipment.

A further object of this invetnion is to form a synchro transmitter having a low mass rotor which has a small outer diameter.

These and other objects of this invention will become apparent from the following description when taken in connection with the drawings, in which:

FIGURE 7 is a cross-sectional view of a second embodiment of the invention.

Figure 9:
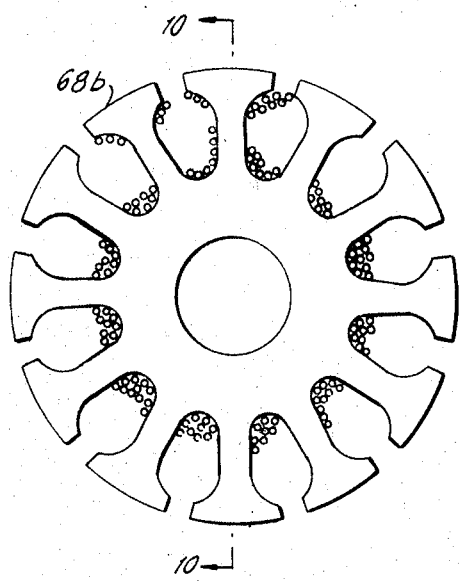
FIGURE 9 is a plan view of a three-phase lamination which can be used in FIGURE 7 with the winding schematically illustrated in the lamination slots.
Figure 10:
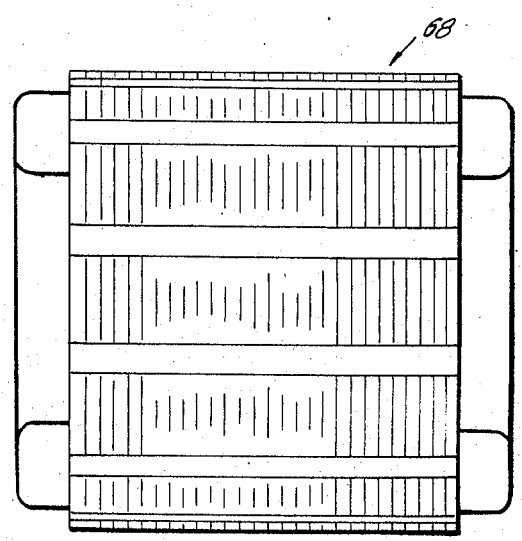
FIGURE 10 is a cross-sectional view of FIGURE 9 taken across the section line 10—10 in FIGURE 9.
Figure 11:
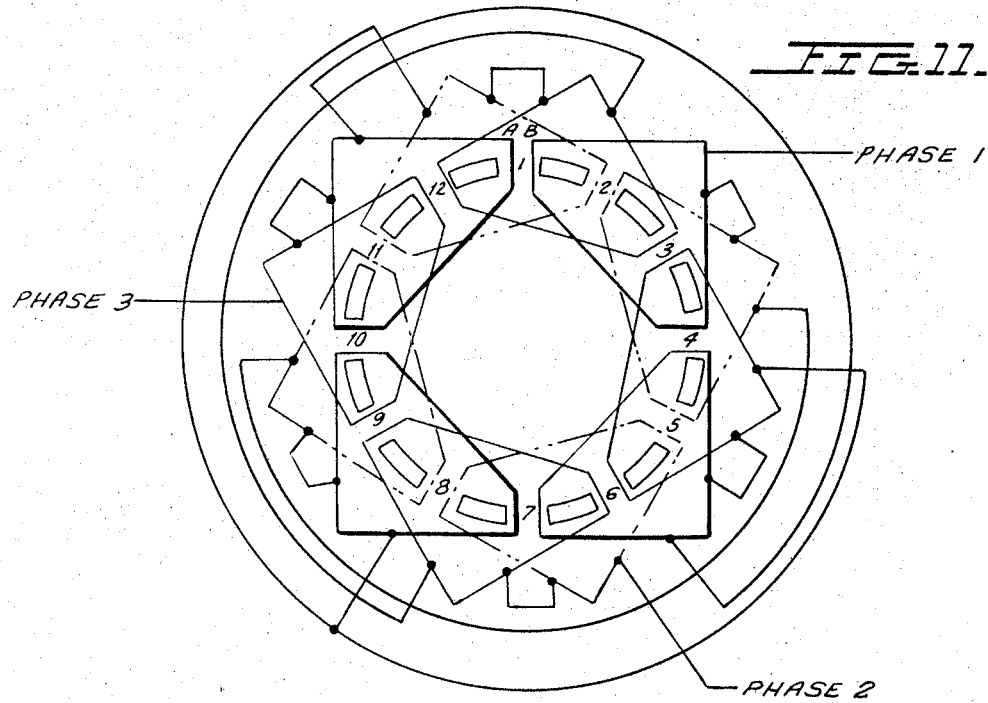

FIGURE 11 schematically illustrates the three-phase winding which is used for the magnetic structure of FIGURES 9–10.

Figure 1:
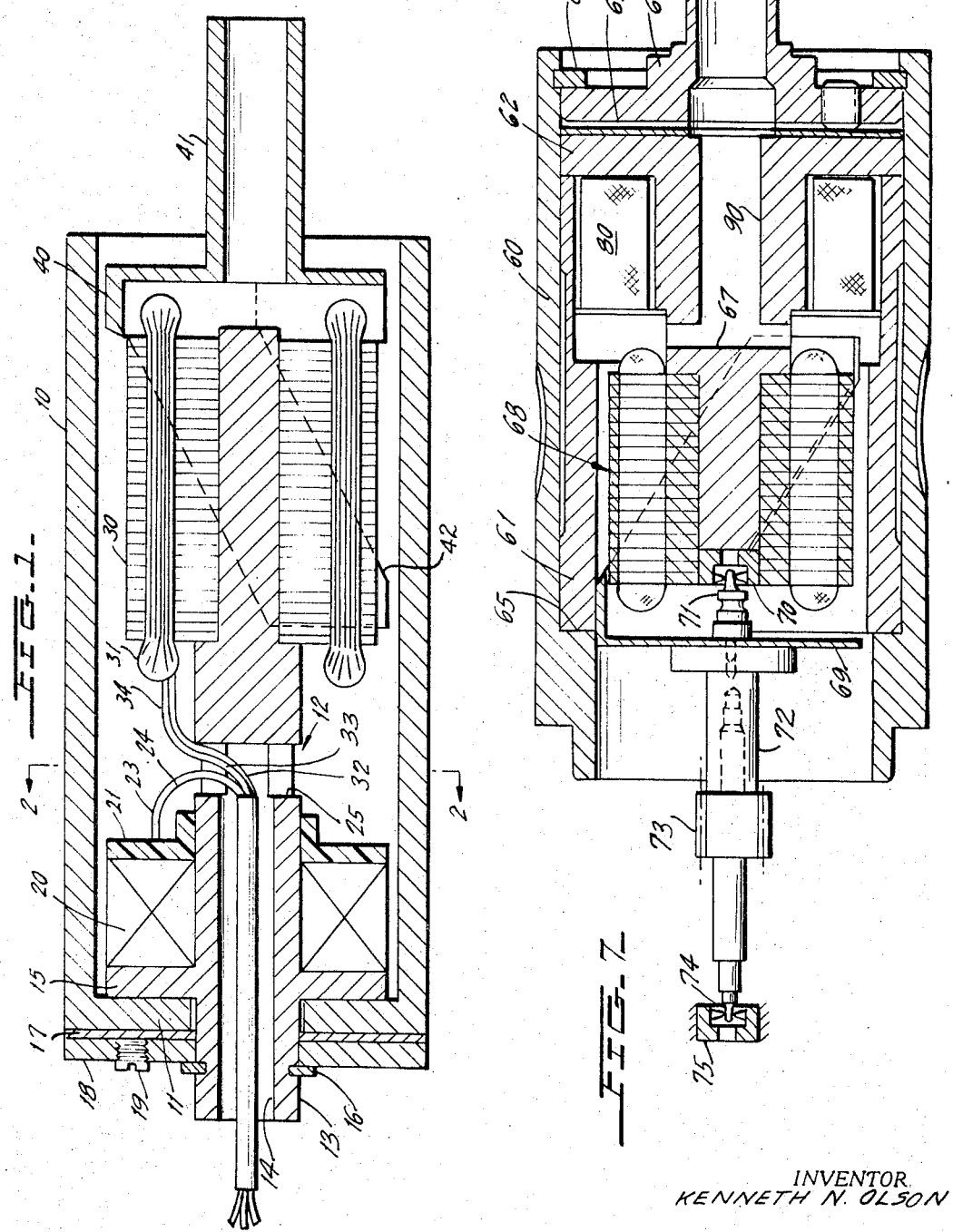
FIGURE 1 is a cross-section of a synchro transmitter made in accordance with the invention.

Referring now to the figures, and particularly FIGURE 1, the novel synchro is formed of a ferromagnetic cup 10 having an elongated cylindrical body and end wall 11. A central core piece 12 of ferromagnetic material has an end portion 13 extending through a central opening in wall 11. Core piece 12 has a central lead receiving opening 14 and an extending flange portion 15. Flange portion 15 is received by the interior of end portion 13 and the core piece 12, which is manufactured as a subassembly, is mounted within cylinder 10 by snap ring 16 which snaps over steel protector disk 17 and mounting disk 18 which has suitable tapped mounting openings, such as opening 19 therein. Tapped openings 19 in plate 18 receive respective calibrations and clamping screws. Disk 17 serves as a protector plate to prevent damage to the magnetic properties of wall 11 when screws in openings 19 are tightened.

A suitable clearance is provided between members 11 and 13 to provide for angular adjustment of the two to obtain the minimum magnetic coupling (null voltage) with the rotatable skewed winding, which will be described, removed. Adjustment of the three (3) screws help obtain minimum coupling, and when tight, clamp members 11 and 13 together.

Figure 2:
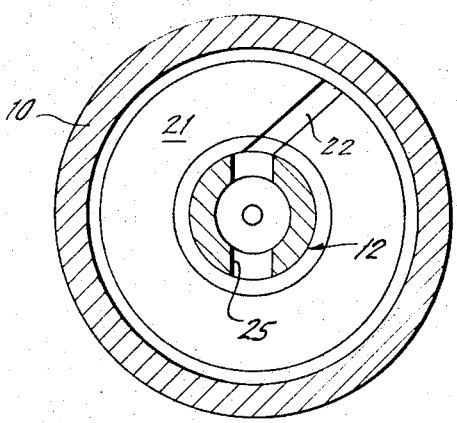
FIGURE 2 is a cross-section of FIGURE 1 taken across section line 2—2 in FIGURE 1.

A single phase winding 20 is then wound on core piece 12 and is contained between flange 15 and a split plastic retainer 21 which is forced-fit on core piece 12. As shown in FIGURE 2, plastic retainer 21 has a slot 22 to permit the force fit. The leads 23 and 24 of winding 20 pass through slot 22 and through opening 25 in core piece 12 and into lead-receiving opening 14.

Figure 6:
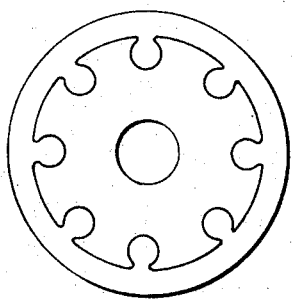
FIGURE 6 is a front view of one of the laminations used in forming the multiphase winding of FIGURE 1 which is concentrically internal of the skewed winding.
Figure 3:
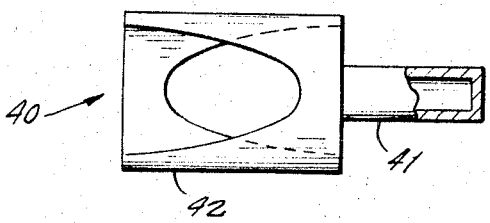
FIGURE 3 is a plan view of the skewed rotor used in the present invention.
Figure 4:
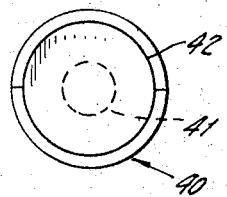
FIGURE 4 is an end view of FIGURE 3 when seen from the left-hand end of FIGURE 3.
Figure 5:
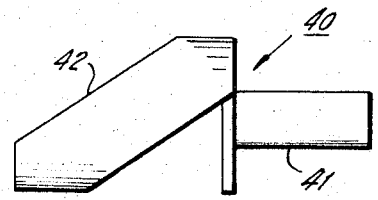
FIGURE 5 is a side plan view of FIGURE 3.

The right-hand portion of core piece 12 has a reduced diameter section which carries a stack of slotted magnetic laminations 30, one of which is shown in FIGURE 6. Each of these laminations have aligned slots which receive a three-phase winding 31 which is wound in the laminations by standard coil winding apparatus. The three leads 32, 33 and 34 of winding 31 are then passed through opening 25 and into hollow lead passing opening 14 in core piece 12. This then completes the core piece subassembly.

In order to control the coupling between windings 20 and 31, a one-piece highly conductive skewed rotor 40 is mounted concentrically around laminations 30 and winding 31 and within magnetic casing 10. Skewed rotor 40 has an extending shaft 41 which extends from an enlarged cylindrical shell 42 having two bias cuts therethrough to form a single continuous skewed turn extending over the length of laminations 30.

Extending shaft 41 is fixed to the member whose rotation is to be measrued with the cylinder 10 being stationarily mounted with respect thereto so that rotor 40 floats within the gap between laminations 30 and cylinder 10.

In operation, winding 31 is asymmetrically energized, as by connection of a single phase source to the terminals of two of the three windings. The coupling of the flux produced by winding 31 to winding 20 will be controlled by the angular position of skewed rotor 40. That is, as skewed rotor 40 is rotated, it will receive more or less of the flux passing through the radial air gap between lamination 30 and cylinder 10. Thus, more or less current will flow in its shorted turn, thereby producing more or less additional flux in core piece 12 so that the current induced in winding 20 will be related to the angular position of rotor 40.

FIGURE 7 illustrates a second embodiment of the invention which permits improved packaging and modifies the external configuration of the device. More particularly, in FIGURE 7, the device is comprised of an outer casing 60 which contains an internal magnetic sleeve 61, a magnetic core piece 62, and insulation spacer 63, and end plate 64 which are held in engagement within external housing 60 by the shoulder 65 and snap ring 66. A stationary magnetic core piece 67 carries a plurality of magnetic laminations 68 which receive the skewed winding 69 in a manner similar to that described in FIGURE 1 for the skewed windings 40. Magnetic core piece 67 of FIGURE 7 has secured to the end thereof a jeweled bearing structure 70 which receives jeweled end 71 of shaft 72 which is secured to winding 69. Shaft 72 may then have a driving gear 73 thereon and its opposite end carries a jeweled support 74 which is received by some external support mechanism in the apparatus which is to receive the device of FIGURE 7. This mechanism is schematically illustrated in FIGURE 7 as a fixed jeweled bearing 75.

A single-phase winding 80, similar to single-phase winding 20 of FIGURE 1, is then carried on core piece 62, while the magnetic laminations 68 can be formed either for a single-pole winding or a multipole winding.

Figure 8:
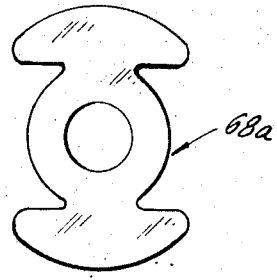
FIGURE 8 is a front plan view of a salient pole lamination which can be used in the device of FIGURE 7.

FIGURE 8 illustrates the shape of the laminations in plan view as lamination 68a for the case of a salient pole arrangement.

FIGURES 9, 10 and 11 illustrate the manner in which the lamination package 68 can be formed for a three-phase unit. Thus, each lamination of package 68 of FIGURE 10 will have the configuration shown in FIGURE 9 for lamination 68b which has twelve slots extending therein from the outer periphery of the lamination. A three-phase winding is then wound in the slots in the manner illustrated in FIGURE 10 where the slots are numbered from 1 to 12 with the windings wound in the manner schematically illustrated for phases 1, 2 and 3.

It will be apparent from FIGURE 7 that the leads for winding 60 and the winding formed on lamination 68 can be taken out through the central channel 90 to regions exterior of the device in the manner described in FIGURE 1.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A synchro device comprising in combination
    (a) a cup-shaped body of magnetic material having a cylindrical body, an end member extending across one end thereof and having an opposite open end;
    (b) a central elongated core member of magnetic material having first and second axially spaced windings thereon; said central core member fixed within said cup-shaped body and coaxial therewith;
    (c) magnetic lamination means mounted on said central core member having means for receiving said second winding;
    (d) and a skewed conductive rotor forming a single skewed turn;
    (e) said rotor being concentric with said magnetic lamination means and rotatable with respect thereto; said rotor positioned in a radial air gap between the outer surface of said magnetic laminations and the interior surface of said cylindrical body;
    (f) and mounting means for mounting said rotor rotatably with respect to said core piece and cup-shaped body.

2. The device as set forth in claim 1 wherein said means for receiving said second winding comprise axially directed slots extending to the exterior of said magnetic laminations.

3. The device as set forth in claim 1 wherein said core member has a hollow central portion leading to one end thereof; said first and second windings having extending leads; said extending leads passing through said hollow portion.

4. The device as set forth in claim 1 wherein said end member of said cup-shaped body has an opening therein; said central core member having a flange thereon spaced from one end thereof; said one end of said central core member extending through said opening with said flange received by the interior of said end member; and snap ring means connected to said one end of said central core member on the exterior side of said end member, thereby to secure said central core member and said cup-shaped body.

5. The device as set forth in claim 1 wherein said magnetic lamination means comprise elongated magnetic laminations having necked-down regions adjacent the opposite ends thereof; and a single-phase winding wound on said magnetic lamination means.

6. The device as set forth in claim 1 including shaft means connected to a central portion of said skewed conductive rotor; said shaft means being coaxial with said cup-shaped body of magnetic material; a bearing connected to one end of said shaft adjacent said skewed conductive rotor; and bearing means connected to said centrally located core member for receiving said bearing.

7. The device as set forth in claim 3 including shaft means connected to a central portion of said skewed conductive rotor; said shaft means being coaxial with said cup-shaped body of magnetic material; a bearing connected to one end of said shaft adjacent said skewed conductive rotor; and bearing means connected to said centrally located core member for receiving said bearing.

8. The device as set forth in claim 4 including shaft means connected to a central portion of said skewed conductive rotor; said shaft means being coaxial with said cup-shaped body of magentic material; a bearing connected to one end of said shaft adjacent said skewed conductive rotor; and bearing means connected to said centrally located core member for receiving said bearing.

References Cited

UNITED STATES PATENTS

| 1,794,509 | 3/1931 | Beckmann | 310—49 |
| 2,038,059 | 4/1936 | Reichel et al. | 310—49 X |
| 2,571,810 | 10/1951 | Andresen | 310—49 |
| 2,685,656 | 8/1954 | Soredal et al. | 310—49 |

WARREN E. RAY, *Primary Examiner.*

U.S. Cl. X.R.

310—67, 182, 192, 266; 323—53